United States Patent
Fisher

(10) Patent No.: US 8,407,672 B2
(45) Date of Patent: Mar. 26, 2013

(54) SYSTEMS AND METHODS FOR SYNCHRONIZING SOFTWARE EXECUTION ACROSS DATA PROCESSING SYSTEMS AND PLATFORMS

(75) Inventor: Jeffrey O. Fisher, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/184,461

(22) Filed: Jul. 15, 2011

(65) Prior Publication Data
US 2012/0291013 A1    Nov. 15, 2012

Related U.S. Application Data

(63) Continuation of application No. 10/636,985, filed on Aug. 7, 2003, now Pat. No. 7,984,427.

(51) Int. Cl.
*G06F 9/44* (2006.01)
*G06F 11/00* (2006.01)
(52) U.S. Cl. ........................... 717/124; 714/38.1
(58) Field of Classification Search .......... 717/124–135; 714/37, 38.1
See application file for complete search history.

(56) References Cited

U.S. PATENT DOCUMENTS

| | | | | | |
|---|---|---|---|---|---|
| 5,511,185 | A | * | 4/1996 | Weinbaum et al. | 714/38.12 |
| 6,002,869 | A | * | 12/1999 | Hinckley | 717/124 |
| 6,067,639 | A | * | 5/2000 | Rodrigues et al. | 714/38.11 |
| 6,751,711 | B1 | * | 6/2004 | de Buda | 711/151 |
| 7,055,137 | B2 | * | 5/2006 | Mathews | 717/125 |
| 2003/0098879 | A1 | * | 5/2003 | Mathews | 345/762 |

* cited by examiner

*Primary Examiner* — Wei Zhen
*Assistant Examiner* — Qing Chen
(74) *Attorney, Agent, or Firm* — Brevetto Law Group

(57) ABSTRACT

Systems and methods for software automation are provided. Software testcases are distributed across multiple data processing systems (equivalently, "machines" or "hosts") that may collectively include multiple platforms (equivalently, "operating systems"). A testcase may be executed as one or more processes progressing through a sequence of phases, with execution within a phase being asynchronous among processes. Synchronization of the testcase processes across the data processing systems and platforms may be effected by managing an event; the testcase processes block on the event upon completion of the current testcase phase. A testcase phase execution service on each host handles synchronization events. The definition of the testcase may include metadata that identifies the particular phases in sequence, that is phase names, for the testcase; the phase names identifies the phases to the synchronization process that triggers the synchronization events which initiate each succeeding phase of the testcase.

15 Claims, 6 Drawing Sheets

SYSTEMS AND METHODS FOR SYNCHRONIZING SOFTWARE EXECUTION ACROSS DATA PROCESSING SYSTEMS AND PLATFORMS

CROSS REFERENCE TO RELATED APPLICATIONS

The present invention is related to the following U.S. patent applications which are incorporated herein by reference in their entirety:

Ser. No. 10/637,015 entitled "Systems and Methods for Packaging Files Having Automatic Conversion Across Platforms";

Ser. No. 10/636,988 entitled "Systems and Methods for Building Public Software Packages"; and Ser. No. 10/637,067 entitled "Systems and Methods for a Bootstrap Mechanism for Software Testcase Execution".

TECHNICAL FIELD

The present invention relates to the field of software automation in data processing systems, and in particular, to the execution of testcase processes across multiple data processing systems and platforms, and, further, to the synchronization of such processes.

BACKGROUND INFORMATION

Software applications in modern enterprise data processing environments typically constitute many thousands of lines of source code and implement complex functionality. For example, the Apache web server, a widely available, open source web server, comprises at least 80,000 lines of source code. The Linux operating system, exceeds 1.6 million lines of source code. Testing such software products is a time-consuming task. Testing of software involves the invocation of the program functionality, and, typically, validating the correctness of the results of that functionality.

The testing of software includes the execution of one or more testcases which are designed to exercise the operations that implement the functionality of the software under task. The testcases are run to verify that the software under test does not fail for the testcase conditions, and additionally verify that the output generated is correct.

Generally, software testing includes activities that are performed by members of the software development team, and other activities that are automated, that is, performed by another software program.

Data processing systems, particularly in an enterprise environment, typically constitute a networked data processing system in which a set of commonly-accessed resources provide services to a multiplicity of users attached to the network. These services may include electronic mail (e-mail) services, Internet access, distributed computing services, input/output services, such as printing, etc. Moreover, the software deployed to provide such services as well as to access those services may be deployed across a multiplicity of platforms, that is, operating systems. Corresponding thereto, in the testing of a software product, it may be desirable to run testcases across multiple hosts and platforms. For example, in automating the concurrent navigation of multiple graphical user interfaces (GUIs), each GUI may be navigated by a corresponding process.

However, testcases that use more than one testcase process may give rise to race conditions. For example, one testcase process may generate output used by a second testcase process. Thus, the two processes must be synchronized to avoid the second process executing before the first.

Consequently, there is a need in the art for systems and methods to automate the execution of software testcases using multiple testcase processes deployed across multiple hosts and platforms. Additionally, there are needs in the art for such systems and methods which include mechanisms for mitigating against race conditions.

SUMMARY OF THE INVENTION

The aforementioned needs are addressed by the present invention. In one embodiment, a method of executing a distributed application may be performed. The method includes executing a testcase in a sequence of phases. Each phase has a corresponding set of executable code. The code corresponding to each phase is executed asynchronously across multiple processes. The method also includes initiating each phase of the plurality of phases in response to a synchronization event. The synchronization event includes an event triggered and handled externally to the testcase.

The aforementioned needs are addressed by the present invention. In one embodiment, a method of executing a distributed application may be performed. The method includes executing a testcase in a sequence of phases. Each phase has a corresponding set of executable code. The code corresponding to each phase is executed asynchronously across multiple processes. The method also includes initiating each phase of the plurality of phases in response to a synchronization event. The synchronization event includes an event triggered and handled externally to the testcase.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
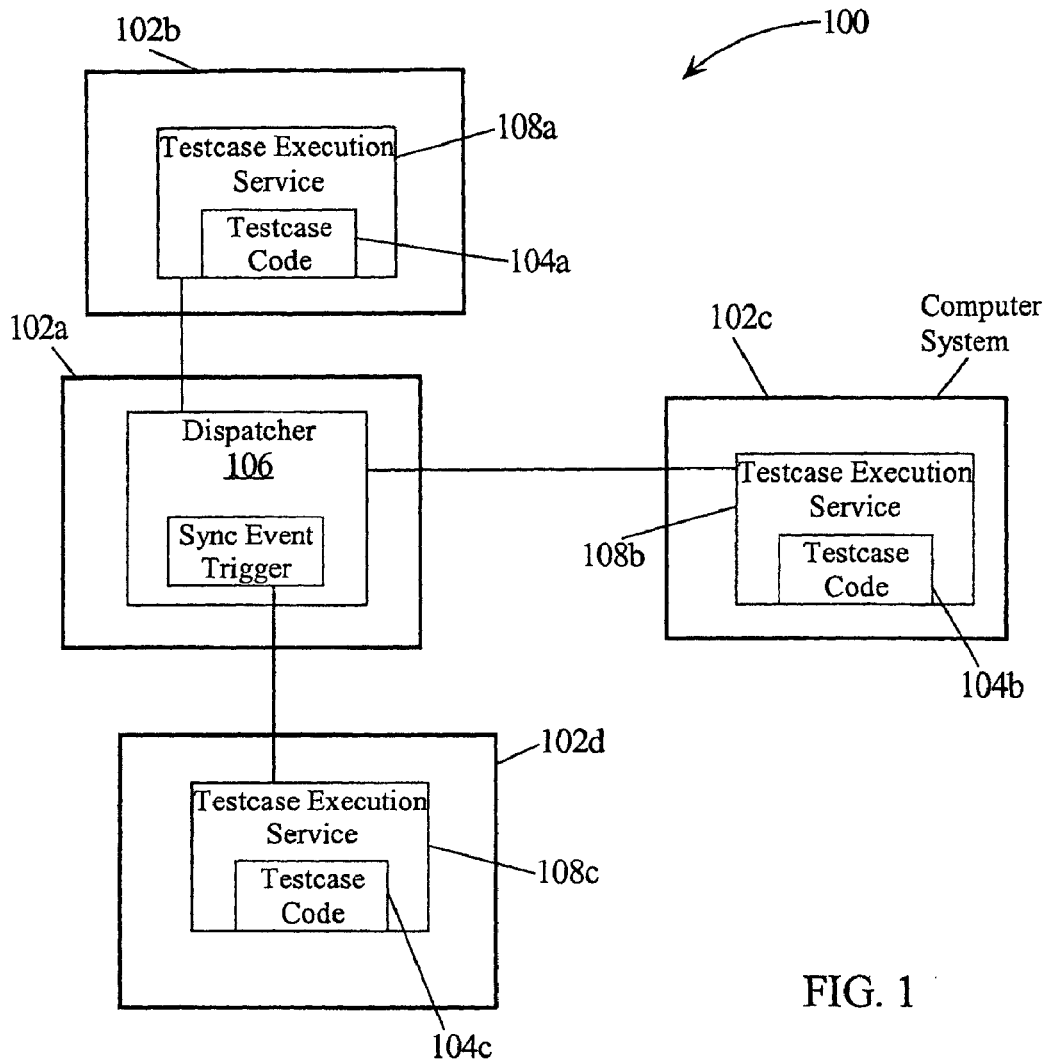
FIG. 1 illustrates an architecture for automating testcase execution in accordance with the present inventive principles.

Systems and methods for software automation are provided. Software testcases are distributed across multiple data processing systems (equivalently, "machines" or "hosts") that may collectively include multiple platforms (equivalently, "operating systems"). A testcase may be executed as one or more processes progressing through a sequence of phases, with execution within a phase being asynchronous among processes. Synchronization of the testcase processes across the data processing systems and platforms may be effected by managing an event; the testcase processes block on the event upon completion of the current testcase phase. A testcase phase execution service on each host handles synchronization events. The definition of the testcase may include metadata that identifies the particular phases in sequence, that is phase names, for the testcase; the phase names identifies the phases to the synchronization process that triggers the synchronization events which initiate each succeeding phase of the testcase.

In the following description, numerous specific details are set forth to provide a thorough understanding of the present invention. For example, particular interprocess communication (IPC) mechanisms may be referred to, however, it would be recognized by those of ordinary skill in the art that the present invention may be practiced without such specific details, and, in other instances, well-known circuits have been shown in block diagram form in order not to obscure the present invention in unnecessary detail. Refer now to the drawings, wherein depicted elements are not necessarily shown to scale and wherein like or similar elements are designated by the same reference numeral through the several views.

FIG. 1 schematically illustrates a software automation architecture for executing testcases across multiple data processing hardware and platforms in accordance with the present inventive principles. Architecture 100 includes a plurality of data processing systems 102a-102d which may be conventional workstations, server hardware or similar devices. In accordance with the present inventive principles, data processing systems 102b-102d need not have the same operating system (not shown). (An operating system may also be referred to as a platform.) In other words, a different operating system may be deployed on each of data processing systems 102b-102d, or different combinations of operating systems may be deployed on these data processing systems. Likewise, the operating system deployed on data processing system 102a may thus be different from any of (or the same as) the data processing systems deployed on data processing systems 102b-102d. In this way, the testcases, depicted in FIG. 1 as testcase may be executed across different platforms and data processing hardware.

The execution of a testcase across such a multiple host, multiple platform architecture is mediated by dispatcher 106. The operation of dispatcher 106 will be discussed further hereinbelow. In particular, dispatcher 106 may provide synchronization services with respect to execution of the testcase, as discussed in conjunction with FIG. 3 and FIGS. 5A and 5B, below. Additionally, a testcase phase execution service 108a-108c may be included in each of data processing systems 102b-102d. The testcase phase execution service may provide a wrapper around the testcase software itself, and provide an interface between the testcase code and dispatcher 106. In other words, as discussed further hereinbelow, the testcase phase execution service provides a mechanism for synchronization of the execution of the testcase, and an interface between the testcase executable and dispatcher 106.

Figure 2:
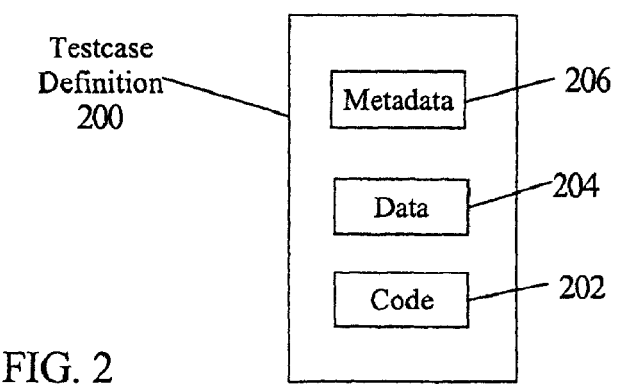
FIG. 2 illustrates, schematically, a testcase definition which may be used in conjunction with the architecture of FIG. 1.

In particular, in accordance with the present inventive principles, a testcase may be executed in phases. In any particular phase, execution may be asynchronous across data processing systems and/or platforms. This may be effected using a testcase definition structure 200 in accordance with the present inventive principles illustrated in FIG. 2. Testcase definition 200 includes code 202 which may include the executable code that perform the operations constituting the test to be performed. Additionally, the testcase definition includes any data, 204 required by the operations constituting the test to be performed. For example, a testcase for a database client/server application may include code for client-side and server-side operations on the database deployed in respective processes. The testcase definition may include data to initialize the database tables. Additionally, in accordance with the present inventive principles, testcase definition 200 includes metadata 206 which constitutes data about the testcase itself. This metadata may include, for example, the names (or other type of identifiers) for each of the phases of the testcase. In other words, a testcase run may be viewed, in accordance with the principles of the present invention, as a sequence of execution phases punctuated by synchronization points. Between the synchronization points, as previously noted, the execution of the testcase across systems and/or platforms may be asynchronous.

This may be further understood by considering FIGS. 3-6 which illustrate, in flowchart form, testcase execution and synchronization processes in accordance with the principles of the present invention. The flowcharts provided herein are not necessarily indicative of the serialization of operations being performed in an embodiment of the present invention. Steps disclosed within these flowcharts may be performed in parallel. The flowcharts are indicative of those considerations that may be performed to produce the operations available to automate the execution of testcases across data processing systems and/or platforms. It is further noted that the order presented is illustrative and does not necessarily imply that the steps must be performed in the order shown.

Figure 3:
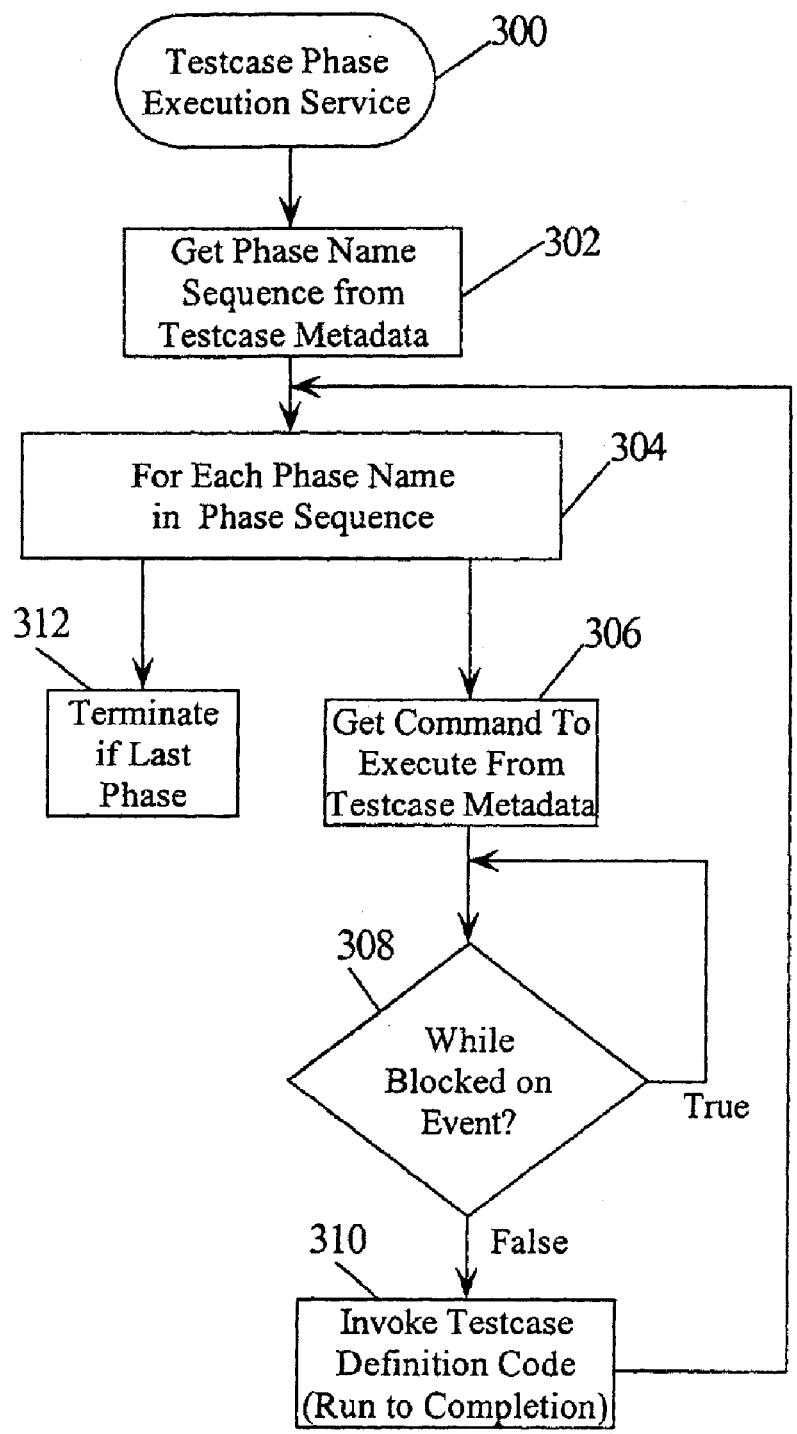
FIG. 3 illustrates, in flowchart form, a testcase phase execution service methodology in accordance with the present inventive principles.

Referring now to FIG. 3, there is illustrated therein a testcase phase execution service process 300 in accordance with the present inventive principles. Testcase phase execution service process 300 may be performed by a testcase phase execution service, such as testcase phase execution service 108a-108c, FIG. 1. Moreover, testcase phase execution service 300 may be invoked by dispatcher 106, FIG. 1. The invocation of test phase execution service 300 may be effected using an interprocess communication (IPC) protocol, or, more particularly, a remote procedure call (RPC) as supported by the particular operating systems deployed on the testcase data processing systems, such as systems 102b-102d, FIG. 1.

Alternatively, remote procedure invocations and interprocess communications may be implemented in an embodiment of the present invention by using high-level process invocation and monitoring services. A mechanism for using such services is provided by the Software Test Automation Framework (STAF). STAF is an open source, multi-platform framework that provides such services as process invocation, resource management, logging, and monitoring. STAF software and documentation are distributed electronically through SourceForge.net. SourceForge.net is a centralized location for Open Source developers to control and manage Open Source software development. SourceForge.net provides hosting to Open Source software development projects. For example, in such an embodiment, the testcase phase execution service may be started using a STAF process service.

Returning to FIG. 3, the phase name sequence is obtained from the testcase definitions metadata, step 302. As discussed in conjunction with FIG. 2, above, the testcase definition metadata may include a list of phase names (i.e. distinct identifiers) for the phases of the particular testcase to be run. The testcase definition may be accessed by testcase phase execution service 300 in response to data provided by a dispatcher, such as dispatcher 106, FIG. 1.

Testcase phase execution service 300 enters a loop over the phases in the sequence in step 304. In step 306, the command to be executed is obtained from the testcase metadata.

In step 308, testcase phase execution service blocks on a phase synchronization event. In this way, the present inventive principles may relieve the testcase itself from having to handle the synchronization of the testcase across testcase processes. Note that a synchronization event may be uniquely associated with each testcase phase. As discussed further below, in an embodiment using STAF, a STAF semaphore service may be used to provide the synchronization event. This will be discussed further in conjunction with FIGS. 5A and 5B. In such an embodiment of the present invention, this may be implemented by associating a corresponding event name with each phase name. (STAF semaphores provide for named event and mutex semaphores.) The use of a STAF semaphore service to post synchronization events will be discussed in conjunction with FIG. 5.

On the triggering of a synchronization event trigger in step 308, testcase phase execution service 300 breaks out of the loop. The testcase definition code is invoked in step 310, and runs to completion. Testcase phase execution service 300 then blocks on the next event by returning to step 304.

On completion of the last phase, testcase phase execution process 300 breaks out of the loop over phases, step 304, and terminates in step 312.

Figure 4:
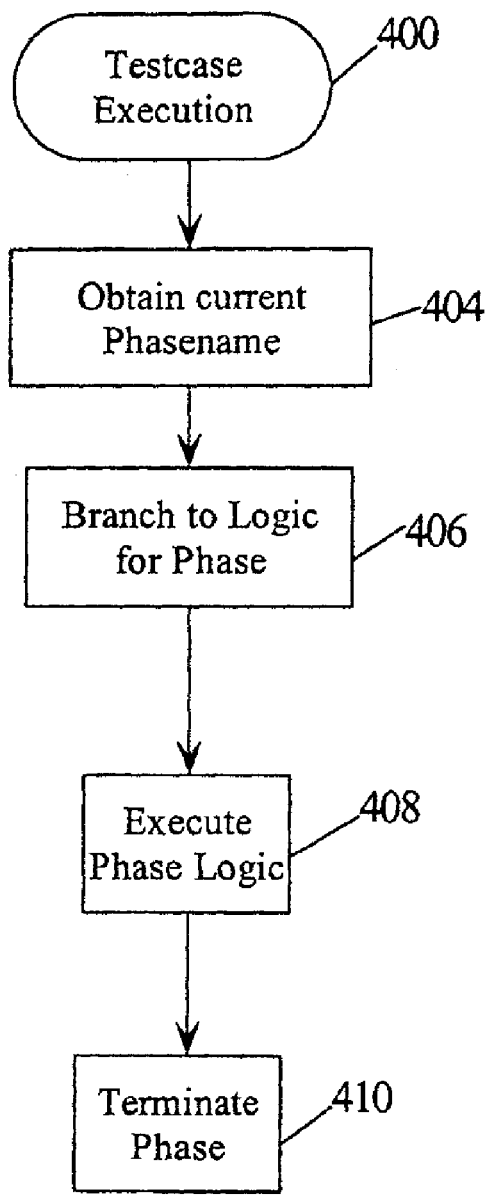
FIG. 4 illustrates, in flowchart form, a testcase code execution methodology in accordance with the principles of the present invention.

Testcase execution may be effected in conjunction with the testcase phase execution service, such as testcase phase execution service 300, FIG. 3 in accordance with testcase execution methodology 400 illustrated, in flow chart form, in FIG. 4. In step 404, the phase name of the current phase is obtained. This may be, for example, extracted from the command line parameters passed through the IPC mechanism. Another mechanism that may be used in an embodiment of the present invention is to pass the phase name in an environment variable. It would be appreciated by those of ordinary skill in the art that the particular technique used to pass in the phase names does not implicate the present inventive principles, and that any of the typically-used parameter-passing mechanisms may be used in conjunction with the present invention. In step 406, the testcase code branches to the logic for the phase having the phase name obtained in step 404. That is, the code may branch to a portion of the executable code corresponding to the current phase. Such a branch may be effected in the testcase code by, for example, a "switch" statement (that is, the branching may be effected by a C-like "switch" statement in the source code; it would be recognized by those of ordinary skill in the art that the executable code corresponds to a set of machine instructions that implement the "switch" statement). (Note that legacy testcases may have been designed to execute asynchronously to completion. It would be appreciated by those of ordinary skill in the art that such testcases are runnable within this invention as a single-phase testcase). This code may represent native machine instructions, virtual machine bytecode, or scripts, depending on the particular development system used to write the testcase. These alternatives do not implicate the present inventive principles, and both fall within the spirit and scope of the present invention. In step 408, the testcase phase code is executed. The testcase execution for the current phase terminates in step 410, and control returns to the testcase phase execution process, such as phase execution process 300, FIG. 3.

Figure 5A:
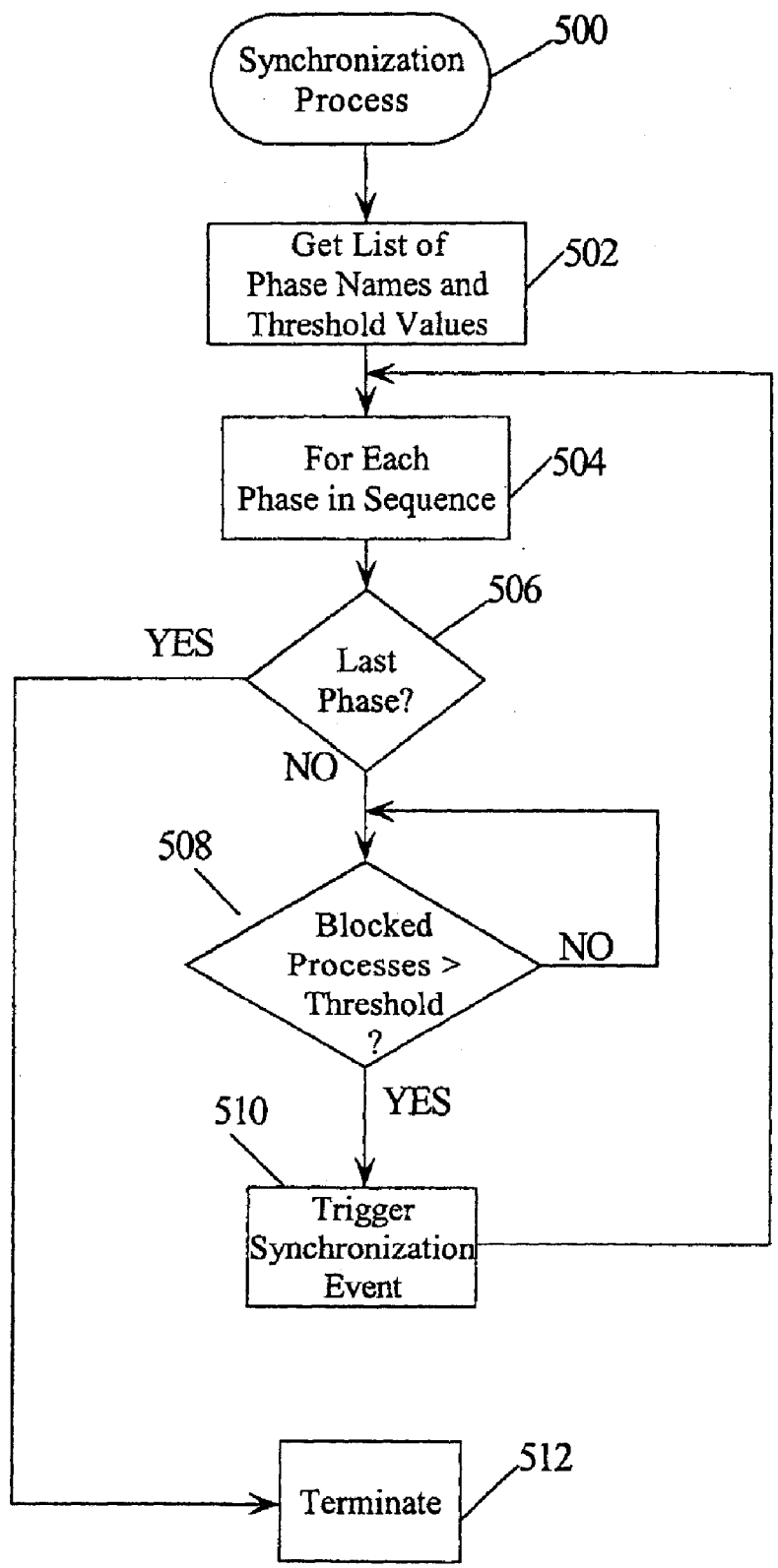
FIGS. 5A and 5B illustrate, in flowchart form, a methodology for synchronizing testcase processes in accordance with the principles of the present invention.
Figure 5B:
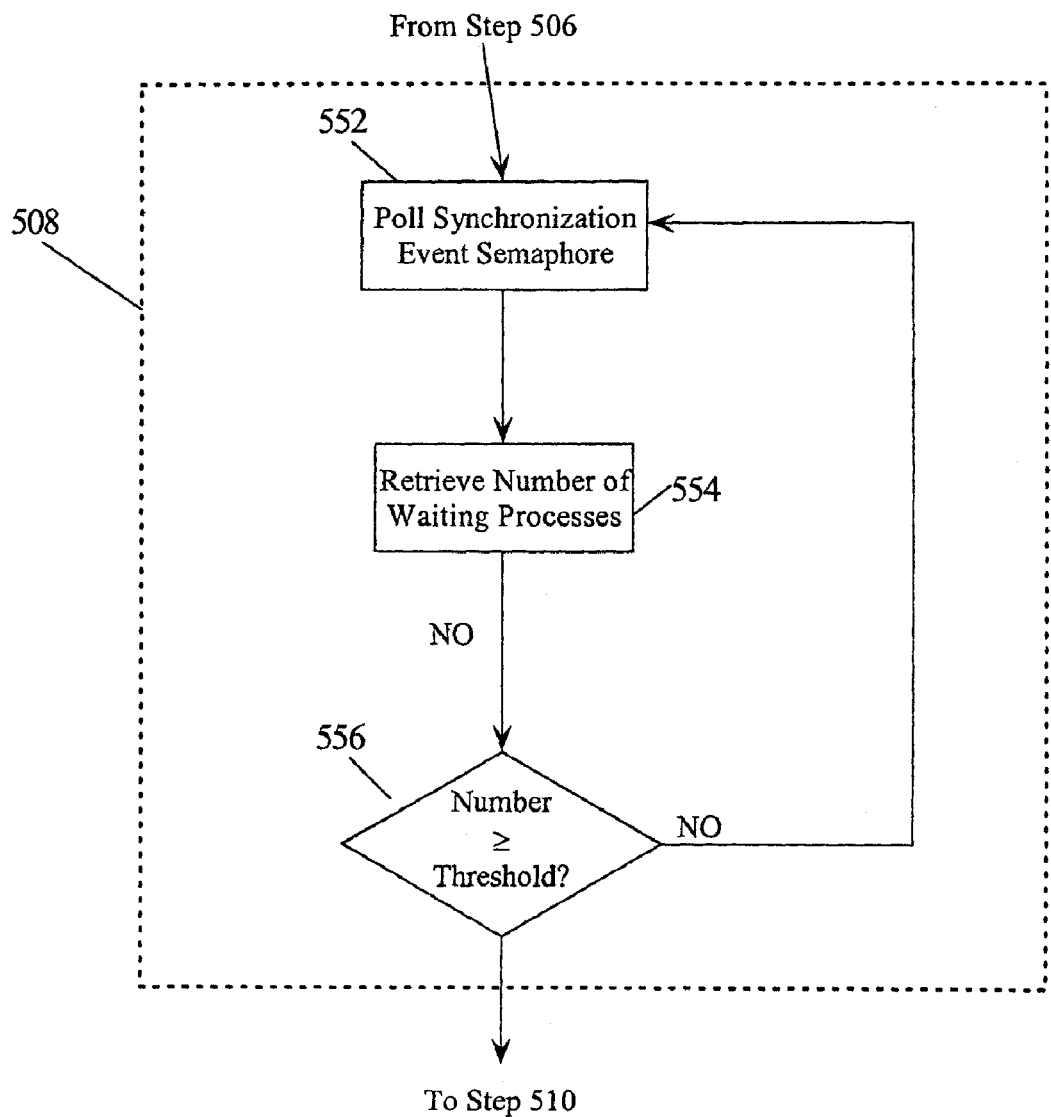

Refer now to FIGS. 5A and 5B illustrating (in partial views), in flow chart form, synchronization process 500 in accordance with the present inventive principles. Recall that synchronization process 500 may be performed by dispatcher 106 in an embodiment according to architecture 100, FIG. 1. However, alternatively, synchronization process 500 may be implemented as a stand-alone process.

In step 502, the phase name sequence is obtained from the testcase definitions metadata, similar to step 302, FIG. 3. Additionally, a threshold value may be obtained from the metadata. In step 504, process 500 enters a loop over the phases for the particular testcase. Recall that the synchronization points are predetermined points in the testcase that punctuate the execution of the testcase to permit the synchronization of the execution across multiple systems and platforms. Typically, a phase is specified by a testcase designer to avoid a potential race condition. However, for the present purposes it suffices that the phases are predetermined by the design of a particular testcase. For each such phase, process 500 continues to step 508, in which a determination is made whether a number of testcase processes blocked on the event associated with the current phase meets or exceeds a preselected threshold. In other words, if the number of testcase processes waiting on the event achieves a "critical mass." The threshold, or "critical mass" value may, for example, be included in the testcase metadata, whereby the triggering of synchronization events on the number of blocked processes may be selected in accordance with the particular testcase.

If the critical mass is achieved, in step 510 the event corresponding to the current phase is triggered. In an alternative embodiment of synchronization process 500, the STAF semaphore service discussed in conjunction with testcase phase service process 300, FIG. 3, may be used. Refer now to FIG. 5B, illustrating alternative steps 508 and 510 in accordance with such an embodiment.

In step 552, the synchronization event semaphore is polled (a STAF event query may be used to effect step 552). The response, in accordance with the STAF specification, includes the number of processes waiting on the event. In step 554, the number of waiting events is retrieved, and in step 556, the number of waiting events is compared to the threshold value. If the number waiting is less than the threshold, step 556 loops back to step 552 ("No" branch of step 556).

If the number of waiting processes meets or exceeds the threshold, in step 510 the synchronization event is triggered. Recall that in this embodiment, an event name may be associated with each phase in the sequence of phases. Thus, in step 510, the named event associated with the current phase is triggered.

Returning to FIG. 5A, process 500 returns to step 504 and loops over the remaining phases in the sequence for the testcase, repeating steps 506-510 until all testcase phases have been executed. On completion of the last phase, synchronization process 500 breaks out of the loop in step 504, and terminates in step 512.

Figure 6:
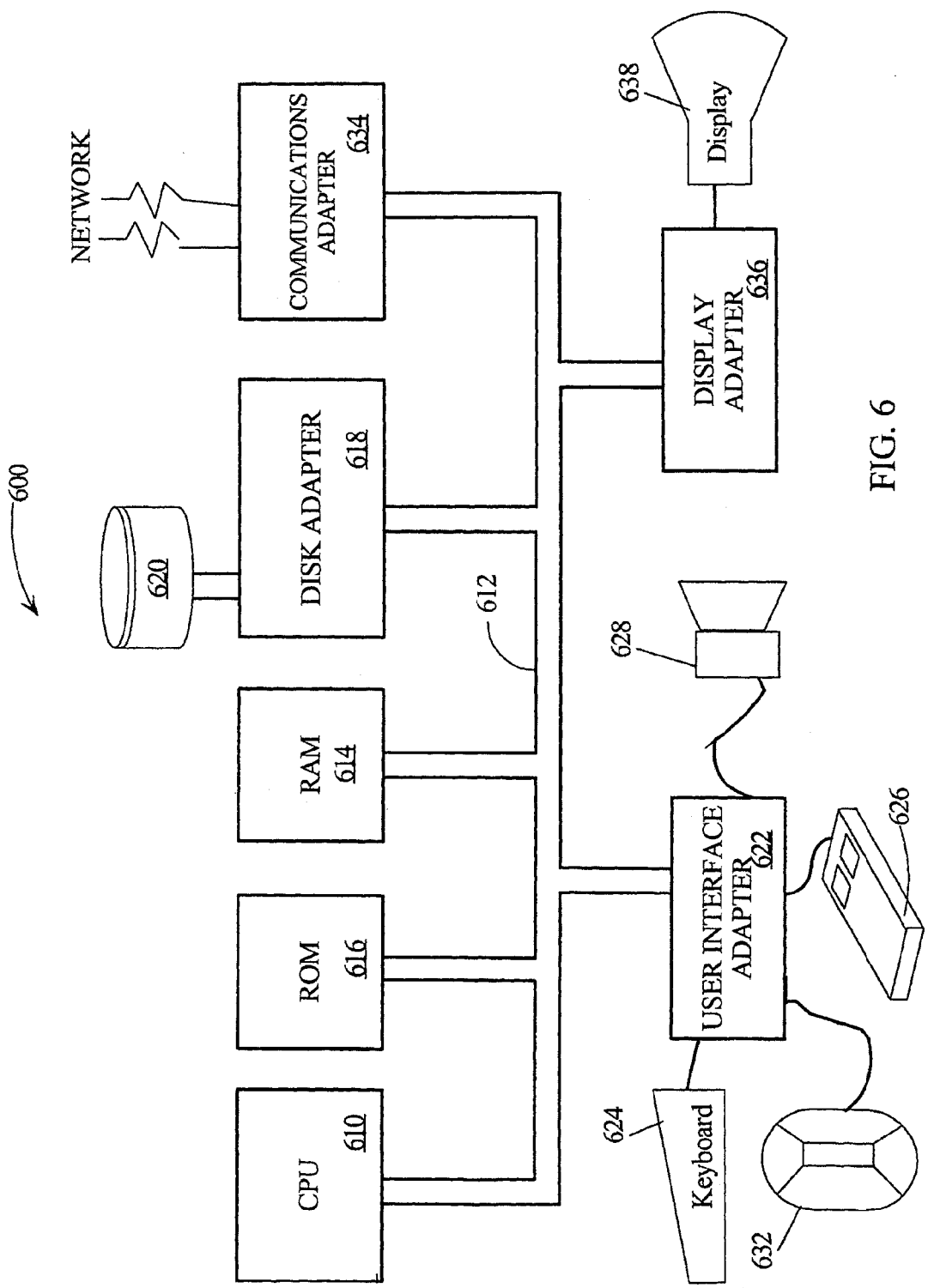
FIG. 6 illustrates, in block diagram form, a data processing system which may be use in conjunction with the methodologies incorporating the present inventive principles.

Referring now to FIG. 6, there is illustrated an exemplary hardware configuration of data processing system 600 in accordance with the subject invention. In one embodiment, this system in conjunction with architecture 100, FIG. 1, including data processing systems 102a-102d and, correspondingly with the methodologies in FIGS. 3-5 for automated, cross-platform multiprocess software automation. Data processing system 600 includes central processing unit (CPU) 610, such as a conventional microprocessor, and a number of other units interconnected via system bus 612. Data processing system 600 also includes random access memory (RAM) 614, read only memory (ROM) 616 and disk adapter 618 for connecting peripheral devices such as disk units 620 to bus 612, user interface adapter 622 for connecting keyboard 624, mouse 626, trackball 632 and/or other user interface devices such as a touch screen device (not shown) to bus 612. System 600 also includes communication adapter 634 for connecting data processing system 600 to a data processing network, enabling the system to communicate with other systems, and display adapter 636 for connecting bus 612 to display device 638. CPU 610 may include other circuitry not shown herein, which will include circuitry commonly found within a microprocessor, e.g. execution units, bus interface units, arithmetic logic units, etc. CPU 610 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 614 of one or more computer systems configured generally as described above. In one embodiment, these sets of instructions, in conjunction with system components that execute them may effect the execution of testcase phases, as described in conjunction with FIGS. 3 and 4, for example. In another embodiment, these sets of instructions, in conjunction with system components that execute them may effect the synchronization process in accordance with the present inventive principles, as discussed in conjunction with FIG. 5. Until required by the computer system, the set of instructions may be stored as a computer program product in another computer memory, for example, in disk drive 620 (which may include a removable memory such as an optical disk or floppy disk for eventual use in the disk drive 620). Further, the computer program product can also be stored at another computer and transmitted to the users work station by a network or by an external network such as the Internet. One skilled in the art would appreciate that the physical storage of the sets of instructions physically changes the medium upon which is the stored so that the medium carries computer readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Though the present inventive principles have been described in the context of a multihost, multiplatform testcase correspondingly distributed across a multiplicity of testcase processes, those of ordinary skill in the art would recognize such a testcase as an exemplar of a scaleable, distributed application. It would be further appreciated by those of ordinary skill in the art that any such distributed application may be executed in accordance with the principles of the present invention, and such embodiments would fall within the spirit and scope of the present invention.

Although the present invention and its advantages have been described in detail, it should be understood that various changes, substitutions and alterations can be made herein without departing from the spirit and scope of the invention as defined by the appended claims.

What is claimed is:

1. A method of executing a distributed plurality of testcase processes including a first testcase process and a second testcase process, the method comprising:

setting a critical mass threshold value indicating a maximum allowable number of testcase processes blocked by the second testcase process;

triggering the first testcase process, wherein the second testcase process is configured to be triggered in response to an output from the first testcase process;

waiting for the output from the first testcase process in anticipation of triggering the second testcase process;

detecting a current number of testcase processes blocked by the second testcase process; and triggering the second testcase process in response to the current number of testcase processes blocked by the second testcase process exceeding the critical mass threshold value.

2. The method of claim 1, further comprising:

retrieving a triggering sequence that specifies an order in which the distributed plurality of testcase processes are to be triggered, wherein the triggering sequence specifies that the first testcase process is to be triggered before the second testcase process and the second testcase process is to be triggered before a third testcase process.

3. The method of claim 2, further comprising:

setting a critical mass threshold value for each of the plurality of testcase processes.

4. The method of claim 3, further comprising:

retrieving the critical mass threshold value for each of the distributed plurality of testcase processes; and retrieving the triggering sequence.

5. The method of claim 2, further comprising:

selecting a next testcase process to be triggered in the triggering sequence; and determining whether the next testcase process is a last testcase process in the triggering sequence.

6. The method of claim 5, wherein the third testcase process is configured to be triggered by an output from the second testcase process, the method further comprising:

determining that the third testcase process is the last testcase process to be triggered in the triggering sequence; and triggering the third testcase process with the output from the second testcase process;

wherein the method does not detect a current number of testcase processes blocked by the third testcase process while waiting for the output from the second testcase process.

7. A computer program product for executing a distributed plurality of testcase processes including a first testcase process and a second testcase process, the computer program product comprising a non-transitory computer readable storage medium having stored thereon computer readable program code that, upon being executed on a computer, causes the computer to perform actions comprising:

setting a critical mass threshold value indicating a maximum allowable number of testcase processes blocked by the second testcase process;

triggering the first testcase process, wherein the second testcase process is configured to be triggered in response to an output from the first testcase process;

waiting for the output from the first testcase process in anticipation of triggering the second testcase process;

detecting a current number of testcase processes blocked by the second testcase process; and triggering the second testcase process in response to the current number of testcase processes blocked by the second testcase process exceeding the critical mass threshold value.

8. The computer program product of claim 7, wherein the actions further comprise:

retrieving a triggering sequence that specifies an order in which the distributed plurality of testcase processes are to be triggered, wherein the triggering sequence specifies that the first testcase process is to be triggered before the second testcase process and the second testcase process is to be triggered before a third testcase process.

9. The computer program product of claim 8, wherein the actions further comprise:

setting a critical mass threshold value for each of the plurality of testcase processes.

10. The computer program product of claim 9, wherein the actions further comprise:

retrieving the critical mass threshold value for each of the distributed plurality of testcase processes; and retrieving the triggering sequence.

11. The computer program product of claim 8, wherein the actions further comprise:

selecting a next testcase process to be triggered in the triggering sequence; and determining whether the next testcase process is a last testcase process in the triggering sequence.

12. The computer program product of claim 11, wherein the third testcase process is configured to be triggered by an output from the second testcase process, the actions further comprise:

determining that the third testcase process is the last testcase process to be triggered in the sequence; and triggering the third testcase process with the output from the second testcase process;

wherein the actions do not detect a current number of testcase processes blocked by the third testcase process while waiting for the output from the second testcase process.

13. A computer comprising:

a non-transitory machine readable storage memory configured to store a distributed plurality of testcase processes including a first testcase process and a second testcase process;

a user interface adapter configured to receive inputs for setting a critical mass threshold value indicating a maximum allowable number of testcase processes blocked by the second testcase process;

a central processing unit (CPU) configured to trigger the first testcase process, wherein the second testcase process is configured to be triggered in response to an output from the first testcase process; and a communications adapter configured to receive inputs indicating a current number of testcase processes blocked by the second testcase process;

wherein the CPU is further configured to wait for the output from the first testcase process in anticipation of triggering the second testcase process, and trigger the second testcase process in response to the current number of testcase processes blocked by the second testcase process exceeding the critical mass threshold value.

14. The computer of claim 13, wherein the CPU is further configured to select a next testcase process to be triggered in a triggering sequence that specifies an order in which the distributed plurality of testcase processes are to be triggered, and determine whether the next testcase process is a last testcase process in the sequence.

15. The computer of claim 14, wherein a third testcase process is configured to be triggered by an output from the second testcase process, the CPU being further configured to determine that the third testcase process is the last testcase process to be triggered in the triggering sequence, and trigger the third testcase process with the output from the second testcase process;

wherein the CPU does not detect a current number of testcase processes blocked by the third testcase process while waiting for the output from the second testcase process.

* * * * *